(12) United States Patent
Tsukamoto (10) Patent No.: US 8,478,112 B2
(45) Date of Patent: Jul. 2, 2013

(54) DIGITAL BROADCAST RECORDING DEVICE

(75) Inventor: Keisuke Tsukamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1102 days.

(21) Appl. No.: 12/030,258

(22) Filed: Feb. 13, 2008

(65) Prior Publication Data

US 2008/0193108 A1     Aug. 14, 2008

(30) Foreign Application Priority Data

Feb. 13, 2007     (JP) ................................. 2007-031563

(51) Int. Cl.
*H04N 5/92*     (2006.01)
(52) U.S. Cl.
USPC ........................................................ 386/291
(58) Field of Classification Search
USPC ......................................... 386/124, 291–299
See application file for complete search history.

(56) References Cited

U.S. PATENT DOCUMENTS

| | | | | |
|---|---|---|---|---|
| 2002/0047815 A1* | 4/2002 | Maeda et al. | ................. | 345/1.1 |
| 2004/0047590 A1* | 3/2004 | Matsuo | ........................... | 386/46 |
| 2006/0215989 A1* | 9/2006 | Lefevre et al. | .................. | 386/83 |
| 2006/0291799 A1* | 12/2006 | Mears et al. | ..................... | 386/83 |
| 2009/0150922 A1* | 6/2009 | Russ et al. | ...................... | 725/30 |

FOREIGN PATENT DOCUMENTS

| | | | |
|---|---|---|---|
| JP | 2000-40300 A | 2/2000 |
| JP | 2002-290887 A | 10/2002 |
| JP | 2003-009086 A | 1/2003 |
| JP | 2004-032093 A | 1/2004 |
| JP | 2004-350056 A | 12/2004 |

* cited by examiner

*Primary Examiner* — Lisa Lewis
(74) *Attorney, Agent, or Firm* — Global IP Counselors (57) ABSTRACT

A digital broadcast recording device includes a receiving component, a program information memory component, a first setting component, a second setting component, an extraction component and a recording execution component. The first setting component sets a recording condition based on a first operation input. The recording condition indicates whether to record program information corresponding to one physical channel, or to record program information corresponding to a subset of a specific number of sub-channels included in the one physical channel. The second setting component sets a channel number corresponding to the subset of the specific number of the sub-channels based on a second operation input. The extraction component extracts the program information corresponding to the subset of the specific number of the sub-channels set by the second setting component. The recording execution component records the program information to the program information memory component.

10 Claims, 4 Drawing Sheets

DIGITAL BROADCAST RECORDING DEVICE

CROSS-REFERENCE TO RELATED APPLICATIONS

This application claims priority to Japanese Patent Application No. 2007-031563 filed on Feb. 13, 2007. The entire disclosure of Japanese Patent Application No. 2007-031563 is hereby incorporated herein by reference.

BACKGROUND OF THE INVENTION

1. Field of the Invention

The present invention generally relates to a digital broadcast recording device. More specifically, the present invention relates to a digital broadcast recording device that receives digital broadcast and stores program information.

2. Background Information

In digital broadcast, a transport stream (TS) protocol is employed. In the TS protocol, a plurality of sub-channels (programs) is multiplexed on a single physical channel (frequency band). A conventional recording and reproduction device receives and records the multiplexed digital broadcast (see Japanese Laid-Open Patent Application 2000-40300, for example). Specifically, the recording and reproduction device extracts and records one broadcast channel (sub-channel) from among a plurality of broadcast channels (sub-channels) broadcasted in TS protocol.

With the recording and reproduction device, however, even though a plurality of sub-channels is received, only one sub-channel is recorded. Thus, the plurality of sub-channels cannot be recorded at the same time. Furthermore, if the plurality of received broadcast programs is recorded directly in TS format, then a tremendous amount of memory is required.

In view of the above, it will be apparent to those skilled in the art from this disclosure that there exists a need for an improved receiving apparatus. This invention addresses this need in the art as well as other needs, which will become apparent to those skilled in the art from this disclosure.

SUMMARY OF THE INVENTION

The present invention was conceived in light of the above problems. One object of the present invention is to provide a digital broadcast recording device with which a digital broadcast is appropriately recorded.

In accordance with one aspect of the present invention, a digital broadcast recording device receives a digital broadcast and stores program information of the digital broadcast. The digital broadcast recording device includes a receiving component, a program information memory component, a first setting component, a second setting component, an extraction component and a recording execution component. The receiving component is configured to receive one physical channel of the digital broadcast. The one physical channel includes a specific number of two or more sub-channels. The program information memory component is configured to store the program information of the digital broadcast received by the receiving component. The first setting component is configured to receive a first operation input from outside and set a recording condition based on the first operation input. The recording condition indicates whether to record the program information corresponding to the one physical channel received by the receiving component, or to record the program information corresponding to a subset of the specific number of the sub-channels included in the one physical channel. The second setting component is configured to receive a second operation input from outside when the first setting component sets the recording condition to record the program information corresponding to the subset of the specific number of the sub-channels. The second setting component is configured to set a channel number corresponding to the subset of the specific number of the sub-channels based on the second operation input. The extraction component is configured to extract the program information corresponding to the subset of the specific number of the sub-channels set by the second setting component from the program information of the digital broadcast received by the receiving component when the first setting component sets the recording condition to record the program information corresponding to the subset of the specific number of the sub-channels. The recording execution component is configured to record to the program information memory component the program information corresponding to the one physical channel of the digital broadcast received by the receiving component when the first setting component sets the recording condition to record the program information corresponding to the one physical channel. The recording execution component is configured to record to the program information memory component the program information corresponding to the subset of the specific number of the sub-channels extracted by the extraction component when the first setting component sets the recording condition to record the program information corresponding to the subset of the specific number of the sub-channels.

With the digital broadcast recording device of the present invention, it is possible to provide a digital broadcast recording device with which a digital broadcast is appropriately recorded.

These and other objects, features, aspects and advantages of the present invention will become apparent to those skilled in the art from the following detailed description, which, taken in conjunction with the annexed drawings, discloses selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
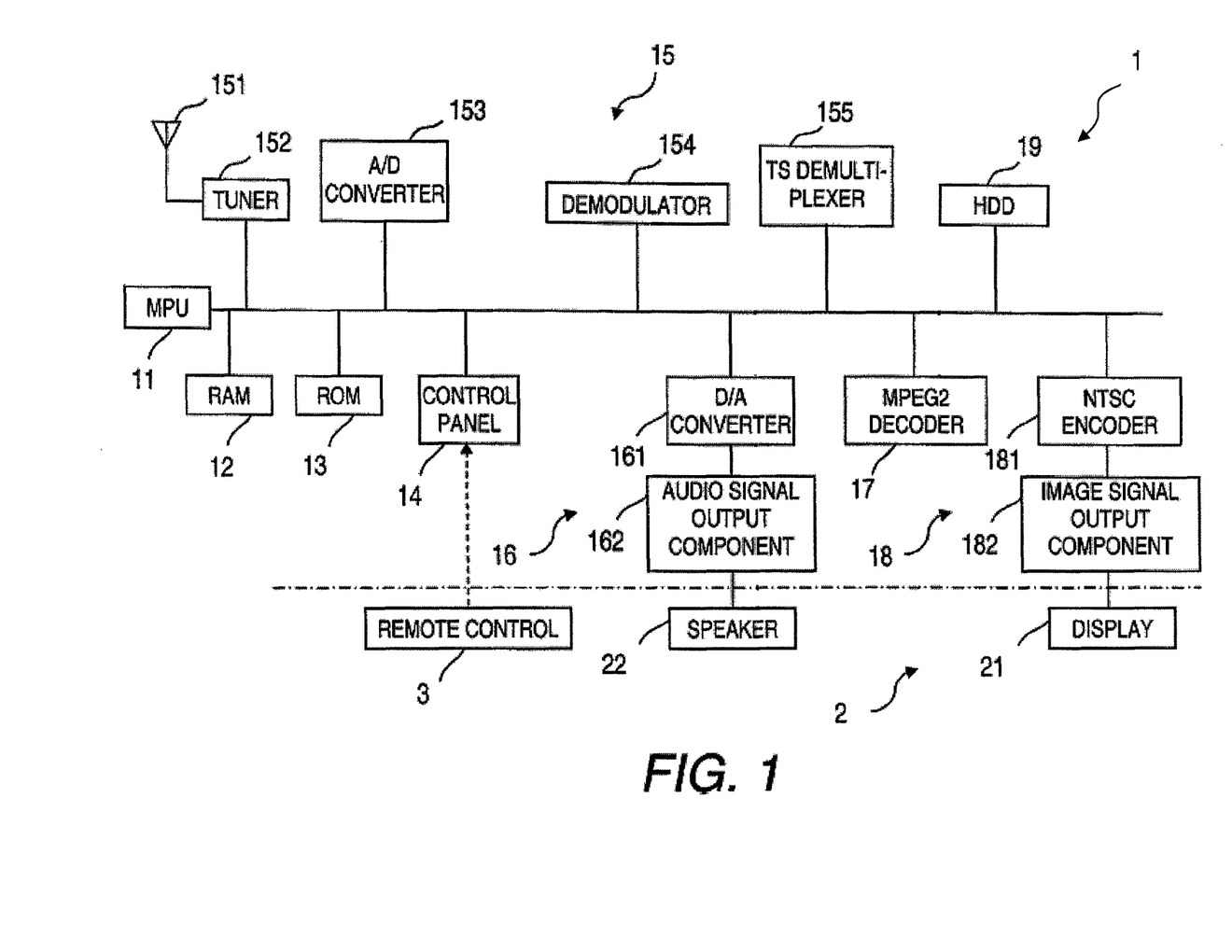
FIG. 1 is a block diagram illustrating a HDD recorder in accordance with one embodiment of the present invention.

FIG. 1 is a block diagram illustrating a hard disk drive (HDD) recorder (e.g., digital broadcast recording device) 1. The HDD recorder 1 is communicably connected to an output device 2. The HDD recorder 1 is also communicably connected to a remote control 3 via infrared communication.

The HDD recorder 1 receives operation input (e.g., first and second operation inputs) from a user via the remote control 3. The HDD recorder 1 receives a digital broadcast based on the operation input. Then, the HDD recorder 1 stores program information of the digital broadcast. The digital broadcast includes physical channels. Each of the physical channels includes a specific number of two or more sub-channels. The HDD recorder 1 also reads the stored program information. Then, the HDD recorder 1 outputs video and audio to the output device 2.

The output device 2 includes a display 21 and a speaker 22. The output device 2 outputs audio information and video information inputted from the HDD recorder 1. The display 21 is a display device such as an LCD (liquid crystal display), PDP (plasma display panel), or the like. The display 21 displays the video information inputted from the HDD recorder 1 so that the video information can be viewed from the outside. The speaker 22 outputs the audio information inputted from the HDD recorder 1.

The remote control 3 receives the operation input from the user. The remote control 3 produces an infrared signal corresponding to the operation input. Then, the remote control 3 outputs the infrared signal to the HDD recorder 1.

The HDD recorder 1 includes an MPU (micro-processing unit) 11, a RAM (random access memory) 12, a ROM (read only memory) 13, a control panel 14, a receiving component 15, an audio output component 16, an MPEG-2 (Motion Picture Experts Group) decoder 17, an image output component 18 and a HDD (hard disk drive) 19.

The MPU 11 controls the overall operation of the HDD recorder 1. The RAM 12 readably and writably stores information such as the audio information and the video information. The ROM 13 stores a control program for MPU 11 and so forth.

The control panel 14 receives various operations, such as switching the power supply on and off and changing channel. The control panel 14 receives the various operations by receiving the infrared signal from the remote control 3 via infrared communication. The receiving component 15 receives and demodulates the digital broadcast. The receiving component 15 includes an antenna 151, a tuner 152, an A/D converter 153, a demodulator 154 and a TS (Transport Stream) multiplexer 155.

The antenna 151 receives digital broadcast waves. The tuner 152 tunes in a preset channel from the digital broadcast waves received by the antenna 151. The A/D converter 153 converts an analog output signal of the tuner 152 into a digital signal. The demodulator 154 demodulates output information from the A/D converter 153. The TS demultiplexer 155 separates the output information demodulated by the demodulator 154 by type, and outputs the audio information and the video information.

The audio output component 16 outputs the audio corresponding to the digital broadcast received by the receiving component 15 to the speaker 22. The audio output component 16 includes a D/A converter 161 and an audio signal output component 162. The D/A converter 161 converts the audio information outputted from the TS demultiplexer 155 (digital information) into an analog audio signal. The audio signal output component 162 outputs the analog audio signal to the speaker 22.

The MPEG-2 decoder 17 decodes the video information outputted from the TS demultiplexer 155 into pre-compression video information.

The image output component 18 outputs the video information decoded by the MPEG-2 decoder 17 to the display 21. The image output component 18 includes an NTSC (National Television Standards Committee) encoder 181 and a video signal output component 182. The NTSC encoder 181 converts the video information decoded by the MPEG-2 decoder 17 into an NTSC-format television signal. The video signal output component 182 outputs the NTSC-format television signal to the display 21.

The HDD 19 stores video information, audio information, and various other kinds of information according to commands from the MPU 11.

The HDD recorder 1 receives the digital broadcast as follows. First, a transmitted digital broadcast wave is received by the antenna 151. When the control panel 14 is used to tune in a channel, switching of a transponder or a channel received by the tuner 152 is performed. The received digital broadcast wave is converted into digital information by the A/D converter 153, and demodulated by the demodulator 154.

The digital broadcast wave is transmitted from a transmitting side (transmitting station) as a TS (transport stream) packet. The TS packet includes the video information, the audio information, control information, and so forth. The video information, the audio information and the control information are separated and outputted by the TS demultiplexer 155. Then, the video information, the audio information and the control information are stored in the RAM 12. The audio information is read out from the RAM 12, and is converted into an analog signal by the D/A converter 161. Then, the audio is outputted from the speaker 22 via the audio signal output component 162.

Also, the video information is read out from the RAM 12, and is decoded into pre-compression video information by the MPEG-2 decoder 17. Then, the pre-compression video information is converted into an NTSC-format television signal by the NTSC encoder 181. Then, the video is displayed on the display 21 via the video signal output component 182.

Figure 2:
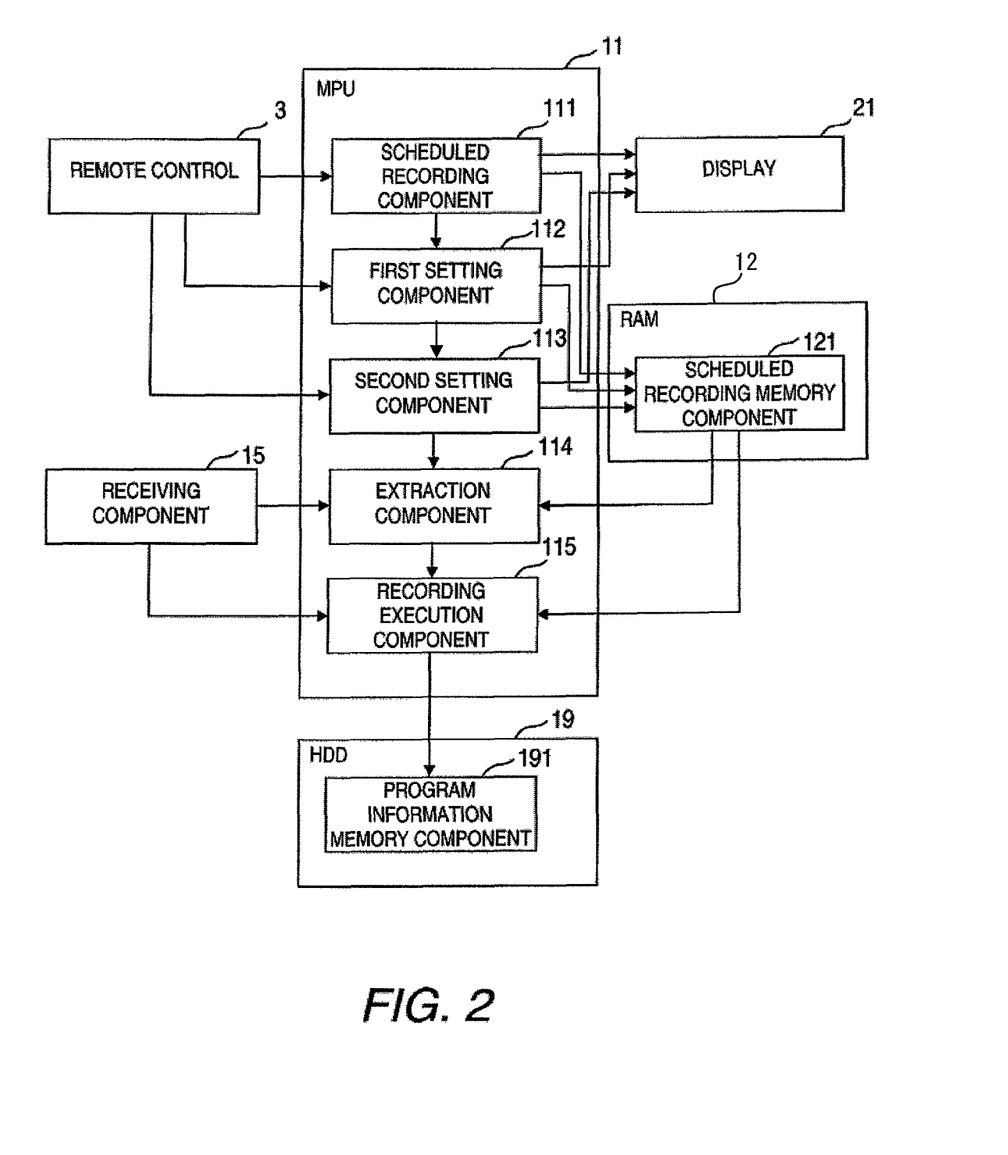
FIG. 2 is a block diagram illustrating a functional configuration of the HDD recorder illustrated in FIG. 1.

FIG. 2 is a block diagram illustrating a functional configuration of the HDD recorder 1. The MPU 11 functionally includes a scheduled recording component 111, a first setting component 112, a second setting component 113, an extraction component 114 and a recording execution component 115. The RAM 12 functionally includes a scheduled recording memory component 121. The HDD 19 functionally includes a program information memory component 191.

The MPU 11 reads and executes a control program that has been pre-stored in the ROM 13, etc., shown in FIG. 1. Then, the MPU 11 functions as the scheduled recording component 111, the first setting component 112, the second setting component 113, the extraction component 114, the recording execution component 115, or another such functional component. Also, the MPU 11 causes the RAM 12 to function as the scheduled recording memory component 121 or another such functional component. Furthermore, the MPU causes the HDD 19 to function as the program information memory component 191 or another such functional component.

Data stored in the RAM 12 and ROM 13 can be stored on a removable recording medium such as a hard disk, optical disk, flexible disk, CD (Compact Disk), DVD (Digital Versatile Disk), semiconductor memory, or the like. In this case, the data can be readable by a hard disk drive, optical disk drive, flexible disk drive, silicon disk drive, cassette medium reader, or other such driver.

The scheduled recording memory component 121 stores physical channel number information, sub-channel number information, recording start time information and recording end time information of programs that is set to be recorded by the scheduled recording component 111 and the second setting component 113.

The program information memory component 191 stores program information acquired by the recording execution component 115 via the receiving component 15.

The scheduled recording component 111 receives the operation input from the user via the remote control 3. Then, the scheduled recording component 111 sets the physical channel number information, the recording start time information and the recording end time information of the program to be recorded based on the operation input. The scheduled recording component 111 stores the set information in the scheduled recording memory component 121.

The first setting component 112 receives a first operation input from the user via the display 21 and the remote control 3. The first setting component 112 sets recording conditions based on the first operation input. The recording conditions indicate whether to record the program information corresponding to one physical channel of the digital broadcast received by the receiving component 15, or to record the program information corresponding to a subset of the specific number of the sub-channels included in the one physical channel. The subset of the specific number of the sub-channels includes one sub-channel out of the specific number (such as three) of sub-channels or a plurality (such as two) of sub-channels fewer than the specific number (such as three).

Specifically, the first setting component 112 sets whether to record the program information corresponding to the one physical channel received by the receiving component 15, or to record the program information corresponding to a sub-channel included in the one physical channel.

When the first setting component 112 sets the recording conditions to record the program information corresponding to the one sub-channel or the plurality of sub-channels fewer than the specific number, the second setting component 113 receives a second operation input from the user via the display 21 and the remote control 3. The second setting component 113 sets a channel number corresponding to the one sub-channel or the plurality of sub-channels fewer than the specific number, based on the second operation input.

Specifically, when the first setting component 112 sets the recording conditions to record the program information corresponding to the one sub-channel, the second setting component 113 sets the channel number corresponding to the one sub-channel. When the first setting component 112 sets the recording conditions to record the program information corresponding to the plurality of sub-channels, the second setting component 113 sets channel numbers corresponding to the plurality of sub-channels. The second setting component 113 also stores the channel number corresponding to the one sub-channel or the plurality of sub-channels in the scheduled recording memory component 121.

When the first setting component 112 sets the recording conditions to record the program information corresponding to the one sub-channel or the plurality of sub-channels fewer than the specific number, the extraction component 114 extracts the program information corresponding to the one sub-channel or the plurality of sub-channels fewer than the specific number set by the second setting component 113 from among the program information of the one physical channel received by the receiving component 15.

Specifically, when the first setting component 112 sets the recording conditions to record the program information corresponding to the one sub-channel, the extraction component 114 extracts the program information corresponding to the one sub-channel set by the second setting component 113 from among the program information of the one physical channel received by the receiving component 15. When the first setting component 112 sets the recording conditions to record program information corresponding to the plurality of sub-channels fewer than the specific number, the extraction component 114 extracts the program information corresponding to the plurality of sub-channels fewer than the specific number set by the second setting component 113 from among the program information of the one physical channel received by the receiving component 15.

When the first setting component 112 sets the recording conditions to record the program information corresponding to the one physical channel, the recording execution component 115 records the program information corresponding to the one physical channel received by the receiving component 15 to the program information memory component 191. When the first setting component 112 sets the recording conditions to record the program information corresponding to the one sub-channel or the plurality of sub-channels fewer than the specific number, the recording execution component 115 records the program information corresponding to the one sub-channel or plurality of sub-channels fewer than the specific number extracted by the extraction component 114 to the program information memory component 191.

Specifically, when the first setting component 112 sets the recording conditions to record the program information corresponding to the one physical channel, the recording execution component 115 records the program information corresponding to the one physical channel received by the receiving component 15. When the first setting component 112 sets the recording conditions to record the program information corresponding to the one sub-channel, the recording execution component 115 records the program information corresponding to the one sub-channel extracted by the extraction component 114 to the program information memory component 191. When the first setting component 112 sets the recording conditions to record the program information corresponding to the plurality of sub-channels fewer than the specific number, the recording execution component 115 records the program information corresponding to the plurality of sub-channels fewer than the specific number extracted by the extraction component 114 to the program information memory component 191.

Figure 3A:
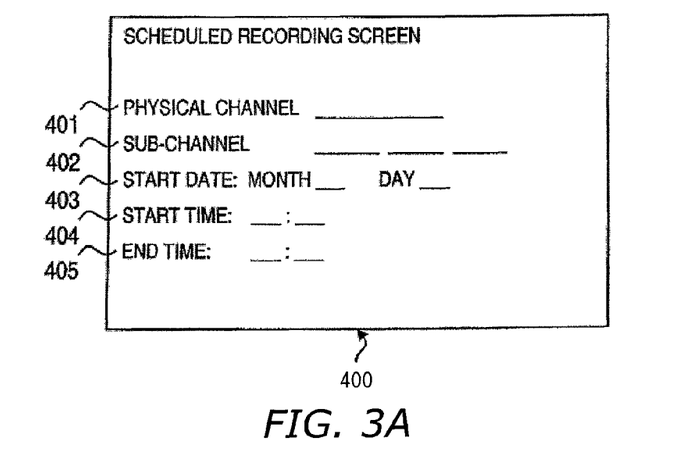
FIG. 3A is a screen shot illustrating a scheduled recording screen.
Figure 3B:
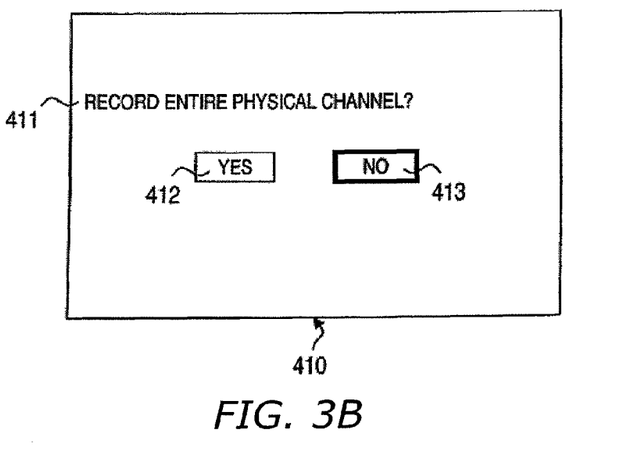
FIG. 3B is a screen shot illustrating a first setting screen.
Figure 3C:
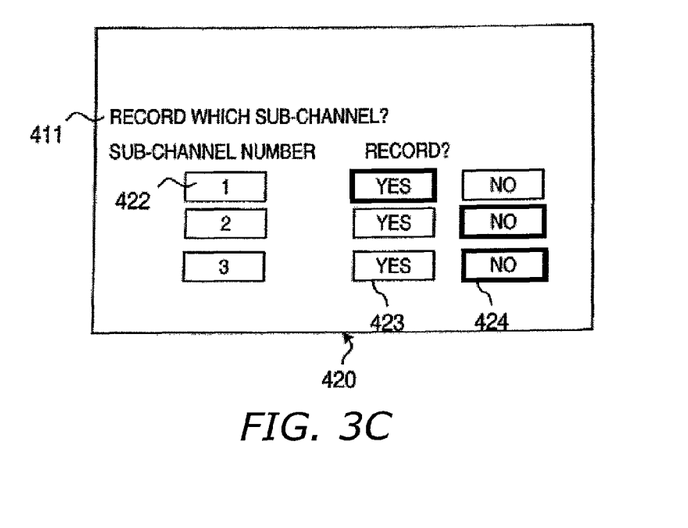
FIG. 3C is a screen shot illustrating a second setting screen.

FIGS. 3A-3C are screen shots illustrating a scheduled recording screen 400, a first setting screen 410 and a second setting screen 420 displayed on the display 21 by the scheduled recording component 111, the first setting component 112 and the second setting component 113. The scheduled recording screen 400 includes a physical channel number display component 401, a sub-channel number display component 402, a recording start date display component 403, a recording start time display component 404 and a recording end time display component 405. The physical channel number display component 401, the sub-channel number display component 402, the recording start date display component 403, the recording start time display component 404 and the recording end time display component 405 are displayed in this order from the top on the scheduled recording screen 400.

The physical channel number display component 401 displays the physical channel number of the program to be recorded to the program information memory component 191. The physical channel number is inputted by the remote control 3. The physical channel number display component 401 is displayed by the scheduled recording component 111.

The sub-channel number display component 402 displays the sub-channel number of the program to be recorded to the program information memory component 191. The sub-channel number is inputted by the remote control 3. The sub-channel number display component 402 is displayed by the second setting component 113.

When one sub-channel number is inputted to the sub-channel number display component 402, the first setting component 112 sets the recording conditions to record the program information corresponding to the one sub-channel out of the specific number of sub-channels included in the one physical channel. When a plurality of sub-channel numbers are inputted to the sub-channel number display component 402, the first setting component 112 sets the recording conditions to record the program information corresponding to the plurality of sub-channels out of the specific number of sub-channels included in the one physical channel. When no sub-channel number is inputted to the sub-channel number display component 402, the first setting component 112 sets the recording conditions to record the program information corresponding to the one physical channel.

The recording start date display component 403, the recording start time display component 404 and the recording end time display component 405 display a program recording start date, a recording start time and a recording end time of the program to be recorded by the program information memory component 191, respectively. The program recording start date, the recording start time and the recording end time are inputted by the remote control 3.

Here, a case of scheduling the recording of a program is described. However, the present invention can also be applied to a case of recording according to an instruction received when a record button provided to the remote control 3 is pressed. FIGS. 3B and 3C are screen shots illustrating the first setting screen 410 displayed by the first setting component 112 and the second setting screen 420 displayed by the second setting component 113.

The first setting screen 410 displays a guidance display component 411, a Yes button 412 and a No button 413. Furthermore, guidance information prompting the user to input whether or not to record the entire physical channel received by the receiving component 15 is displayed on the guidance display component 411 as "Record entire physical channel?"

The Yes button 412 is selected when the entire physical channel (the one physical channel) is to be recorded. The No button 413 is selected when only one or more sub-channels (the subset of the sub-channels of the one physical channel) included in the physical channel are to be recorded. The Yes button 412 and the No button 413 are highlighted with a bold outline when selected. In FIG. 3B, the No button 413 is displayed highlighted, which indicates that the No button 413 is selected.

The second setting screen 420 displays a guidance display component 421, a sub-channel number display component 422, a Yes button 423 and a No button 424. Furthermore, guidance information prompting the user to select the sub-channel number to be recorded is displayed on the guidance display component 421 as "Record which sub-channel?"

The sub-channel number display component 422 displays the sub-channel numbers included in the physical channel received through the receiving component 15. The physical channel is displayed by the second setting component 113. Also, the Yes button 423 and the No button 424 are displayed for each sub-channel number display component 422. Each Yes button 423 is selected when the user wants to record the sub-channel number displayed on the corresponding sub-channel number display component 422. The No button 424 is selected when the user does not want to record the sub-channel number displayed on the corresponding sub-channel number display component 422.

Also, the Yes button 423 and the No button 424 are highlighted with a bold outline when selected. In FIG. 3C, the Yes button 423 corresponding to the sub-channel number display component 422 with the sub-channel number "1" is highlighted. Also, the No buttons 424 corresponding to the sub-channel number display components 422 with the sub-channel numbers "2" and "3" are highlighted. This indicates that the system is set to record the sub-channel number "1."

The recording is set by receiving a signal from the record button provided to the remote control 3. Thus, the user can use the first setting screen 410 and the second setting screen 420 shown in FIGS. 3B and 3C to set whether or not to record the entire physical channel, and to set the sub-channel number to be recorded.

Figure 4:
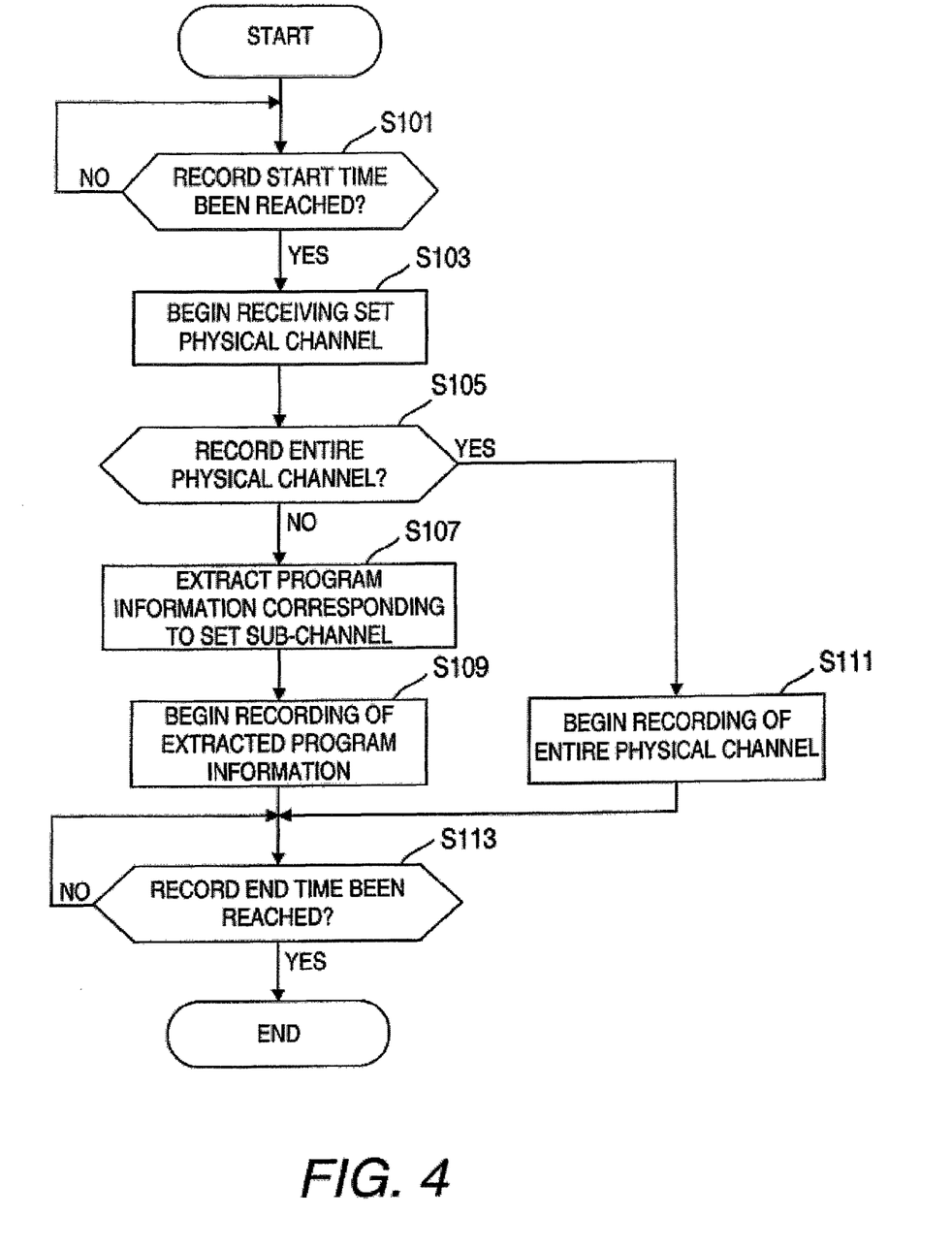
FIG. 4 is a flowchart illustrating an operation of the HDD recorder illustrated in FIG. 1.

FIG. 4 is a flowchart illustrating an operation of the HDD recorder 1 (and mainly the MPU 11). For the sake of convenience, the description here will be of a case in which the physical channel number information, the sub-channel number information, the record start time information and the record end time information for a scheduled recording program have been preset by the scheduled recording component 111, the first setting component 112 and the second setting component 113, and have been stored in the scheduled recording memory component 121.

First, the recording execution component 115 reads the record start time information stored in the scheduled recording memory component 121. Then, the recording execution component 115 determines whether or not the record start time has been reached (S101). If the recording execution component 115 determines that the record start time has not been reached (No in S101), then the processing enters a standby state. If the recording execution component 115 determines that the record start time has been reached (Yes in S101), then the recording execution component 115 reads the physical channel number information stored in the scheduled recording memory component 121. Then, the digital broadcast corresponding to the physical channel number information that has been read is received through the receiving component 15 (S103).

The recording execution component 115 reads the sub-channel number information stored in the scheduled recording memory component 121. The recording execution component 115 determines whether or not the entire physical channel is to be recorded based on whether or not there is sub-channel number information (S105). If there is no sub-channel number information, the recording execution component 115 determines that the entire physical channel is to be recorded (S105). Then, the recording of the entire physical channel to the program information memory component 191 is begun (S111).

If there is sub-channel number information, then the recording execution component 115 determines that the sub-channel corresponding to the sub-channel number information stored in the scheduled recording memory component 121 is to be recorded (No in S105). The extraction component 114 extracts the program information for the sub-channel corresponding to the sub-channel number information stored in the scheduled recording memory component 121 (S107). Then, the recording of the program information for the sub-channel extracted in step S107 to the program information memory component 191 is begun by the recording execution component 115 (S109).

When the processing of step S109 or step S111 is concluded, the recording execution component 115 reads the record end time information stored in the scheduled recording memory component 121. Then, the recording execution component 115 determines whether or not the record end time has been reached (S113). If the recording execution component 115 determines that the record end time has not been reached (No in S113), then the processing enters a standby state. If the recording execution component 115 determines that the record end time has been reached (Yes in S113), then the processing is concluded.

With the HDD recorder 1, the one physical channel of the digital broadcast including the preset specific number of two or more sub-channels is received. The first operation input from the user is received through the remote control 3. Then, the recording conditions are set either to record the program information corresponding to the one physical channel received through the receiving component 15, or to record the program information corresponding to the subset of the specific number of sub-channels. The subset of the specific number of sub-channels includes one sub-channel or a plurality of sub-channels fewer than the specific number.

When a setting is made to record the program information corresponding to the one sub-channel, the second operation input from the user is received through the remote control 3. Based on the second operation input, the channel number corresponding to the one sub-channel is set. Then, the program information corresponding to the one sub-channel is extracted from the program information corresponding to the one physical channel.

When a setting is made to record the program information corresponding to the plurality of sub-channels fewer than the specific number, the second operation input from the user is received through the remote control 3. Based on the second operation input, the channel numbers corresponding to the plurality of sub-channels fewer than the specific number are set. Then, the program information corresponding to the plurality of sub-channels fewer than the specific number is extracted from the program information corresponding to the one physical channel.

When a setting is made to record the program information corresponding to one physical channel, the program information corresponding to the one physical channel is recorded to the program information memory component 191. When a setting is made to record the program information corresponding to the one sub-channel, the program information corresponding to the one sub-channel is recorded to the program information memory component 191. When a setting is made to record the program information corresponding to the plurality of sub-channels fewer than the specific number, the program information corresponding to the plurality of sub-channels fewer than the specific number is recorded to the program information memory component 191. Therefore, the user can select the recording method appropriately. Then, the digital broadcast can be appropriately recorded.

Specifically, when the user wants the specific number of sub-channels included in the one physical channel to be recorded collectively, a setting can be made to record the program information corresponding to the one physical channel. When the user wants to record the program information corresponding to the one sub-channel, a setting can be made to record the program information corresponding to the one sub-channel. Furthermore, the channel number corresponding to the one sub-channel can be set. When the user wants to record the program information corresponding to the plurality of sub-channels fewer than the specific number, a setting can be made to record the program information corresponding to the plurality of sub-channels fewer than the specific number. Furthermore, the channel numbers corresponding to the plurality of sub-channels fewer than the specific number.

Therefore, the user can select the recording method appropriately. Then, the digital broadcast can be appropriately recorded.

Also, the scheduled recording screen 400 shown in FIG. 3A is displayed on the display 21. Furthermore, the recording conditions indicating whether or not to record the program information corresponding to the one physical channel are set via the scheduled recording screen 400. Moreover, the channel number is set via the scheduled recording screen 400. Therefore, the user can easily and simply select the recording method.

The present invention can also be applied to the following modes.

In this embodiment, a case is described in which the digital broadcast recording device is the HDD recorder 1. However, the digital broadcast recording device can be any device that receives television broadcast and stores the program information on a medium (such as a DVD). For instance, the digital broadcast recording device can be a DVD recorder.

In this embodiment, a case is described in which the program to be recorded is recorded by scheduled recording. However, the present invention can also be applied to a case in which recording is performed by pressing the record button provided to the remote control 3 (see FIGS. 3B and 3C).

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A digital broadcast recording device for receiving a digital broadcast and storing program information of the digital broadcast, comprising:

a receiver configured to receive one physical channel of the digital broadcast, the one physical channel including a specific number of two or more sub-channels;

a program information memory configured to store the program information of the digital broadcast received by the receiver; and a controller that:

displays a first setting screen with a guidance information and input buttons, the guidance information prompting a user of the digital broadcast recording device to input a first operation input indicating whether or not the program information corresponding to the one physical channel received by the receiver is entirely recorded, and receives the first operation input from the user through selection of the input buttons of the first setting screen by the user, and set a recording condition based on the first operation input, displays a second setting screen prompting the user to input a second operation input indicating which of the program information corresponding to a subset of the specific number of the sub-channels included in the one physical channel is recorded in response to the receiving of the first operation input indicating that the program information corresponding to the one physical channel received by the receiver is not entirely recorded through selection of one of the input buttons of the first setting screen by the user, the second setting screen being different from the first setting screen, and receives the second operation input from the user, and set a channel number corresponding to the subset of the specific number of the sub-channels based on the second operation input, extracts the program information corresponding to the subset of the specific number of the sub-channels set by the second setting component from the program information of the digital broadcast received by the receiver when the recording condition is set to record the program information corresponding to the subset of the specific number of the sub-channels, and records to the program information memory the program information corresponding to the one physical channel of the digital broadcast received by the receiver when the recording condition is set to record the program information corresponding to the one physical channel, and record to the program information memory the program information corresponding to the subset of tile specific number of the sub-channels extracted by the extraction component when the recording condition is set to record the program information corresponding to the subset of the specific number of the sub-channels.

2. The digital broadcast recording device according to claim 1, wherein the controller further:

sets the recording condition indicating whether to record the program information corresponding to the one physical channel received by the receiver, or records the program information corresponding to one sub-channel out of the specific number of the sub-channels included in the one physical channel, receives the second operation input from the user when the recording condition is set to record the program information corresponding to the one sub-channel, and set the channel number corresponding to the one sub-channel based on the second operation input, the extracts the program information corresponding to the one sub-channel set from the program information of the digital broadcast received by the receiver when the recording condition is set to record the program information corresponding to the one sub-channel, and records to the program information memory the program information corresponding to the one sub-channel extracted when the recording condition is set to record the program information corresponding to the one sub-channel.

3. The digital broadcast recording device according to claim 2, wherein

The controller further:

receives the first operation input to set the recording condition via a monitor connected to the digital broadcast recording device, and receives the second operation input to set the channel number via the monitor.

4. The digital broadcast recording device according to claim 1, wherein the controller further:

sets the recording condition indicating whether to record the program information corresponding to the one physical channel received by the receiver, or to record the program information corresponding to a plurality of sub-channels fewer than the specific number out of the specific number of the sub-channels included in the one physical channel, receives the second operation input from the recording condition is set to record the program information corresponding to the plurality of sub-channels fewer than the specific number, and set the channel numbers corresponding to the plurality of sub-channels fewer than the specific number based on the second operation input, extracts the program information corresponding to the plurality of sub-channels fewer than the specific number set from the program information of the digital broadcast received by the receiver when the recording condition is set to record the program information corresponding to the plurality, of sub-channels fewer than the specific number, and records to the program information memory the program information corresponding to the plurality of sub-channels fewer than the specific number extracted when the recording condition is set to record the program information corresponding to the plurality of sub-channels fewer than the specific number.

5. The digital broadcast recording device according to claim 4, wherein the controller further:

receives the first operation input to set the recording condition via a monitor connected to the digital broadcast recording device, and receives the second operation input to set the channel numbers via the monitor.

6. A digital broadcast recording method for receiving a digital broadcast and storing program information of the digital broadcast, comprising:

receiving one physical channel of the digital broadcast, the one physical channel including a specific number of two or more sub-channels;

displaying a first setting screen with a guidance information and input buttons, the guidance information prompting a user to input a first operation input indicating whether or not the program information corresponding to the one physical channel is entirely recorded;

receiving the first operation input from the user through selection of the input buttons of the first setting screen by the user;

setting a recording condition based on the first operation input;

displaying a second setting screen prompting the user to input a second operation input indicating which of the program information corresponding to a subset of the specific number of the sub-channels included in the one physical channel is recorded in response to receiving the first operation input indicating that the program information corresponding to the one physical channel is not entirely recorded through selection of one of the input buttons of the first setting screen by the user, the second setting screen being different from the first setting screen;

receiving the second operation input from the user;

setting a sub-channel number corresponding to the subset of the specific number of the sub-channels based on the second operation input in a scheduled recording memory;

extracting the program information corresponding to the subset of the specific number of the sub-channels from the program information corresponding to the one physical channel of the digital broadcast upon setting the recording condition to record the program information corresponding to the subset of the specific number of the sub-channels;

determining whether the sub-channel number corresponding to the subset of the specific number of the sub-channels set based on the second operation input is stored in the scheduled recording memory;

recording the program information corresponding to the one physical channel of the digital broadcast based on a physical channel number stored in the scheduled recording memory in response to determining that the sub-channel number corresponding to the subset of the specific number of the sub-channels set based on the second operation input is not stored in the scheduled recording memory; and recording the program information corresponding to the subset of the specific number of the sub-channels in response to determining that a the sub-channel number corresponding to the subset of the specific number of the sub-channels set based on the second operation input is stored in the scheduled recording memory.

7. The digital broadcast recording device according to claim 1, wherein the recording execution component determines whether or not the program information corresponding to the one physical channel of the digital broadcast received by the receiver is to be recorded based on whether or not a the sub-channel number corresponding to the subset of the specific number of the sub-channels set based on the second operation input by the second setting component is stored in the scheduled recording memory.

8. The digital broadcast recording device according to claim 7, wherein the recording execution component determines that the program information corresponding to the one physical channel of the digital broadcast received by the receiver is to be recorded in response to determining that there is no sub-channel number corresponding to the subset of the specific number of the sub-channels set based on the second operation input by the second setting component.

9. The digital broadcast recording device according to claim 7, wherein the second setting component displays the second setting screen with a guidance information that prompts the user to input the second operation input indicating which of the program information corresponding to the subset of the specific number of the sub-channels included in the one physical channel is recorded.

10. The digital broadcast recording device according to claim 9, wherein the first and second setting components display the first and second setting screens in different manners, respectively.

* * * * *